United States Patent
Mwanje et al.

(10) Patent No.: US 11,228,915 B2
(45) Date of Patent: Jan. 18, 2022

(54) DISTRIBUTED SON ENERGY SAVING MANAGEMENT IN HETEROGENEOUS NETWORKS

(71) Applicant: Nokia Solutions and Networks OY, Espoo (FI)

(72) Inventors: Stephen Mwanje, Dorfen (DE); Janne Tapio Ali-Tolppa, Taufkirchen (DE); David Ness Cohn, Morton Grove, IL (US)

(73) Assignee: Nokia Solutions and Networks OY, Espoo (FI)

( * ) Notice: Subject to any disclaimer, the term of this patent is extended or adjusted under 35 U.S.C. 154(b) by 92 days.

(21) Appl. No.: 16/462,509

(22) PCT Filed: Nov. 21, 2016

(86) PCT No.: PCT/US2016/063188
§ 371 (c)(1),
(2) Date: May 20, 2019

(87) PCT Pub. No.: WO2018/093397
PCT Pub. Date: May 24, 2018

(65) Prior Publication Data
US 2019/0349773 A1 Nov. 14, 2019

(51) Int. Cl.
*H04W 16/08* (2009.01)
*H04W 16/28* (2009.01)
*H04W 52/02* (2009.01)
*H04W 84/04* (2009.01)

(52) U.S. Cl.
CPC ............ *H04W 16/08* (2013.01); *H04W 16/28* (2013.01); *H04W 52/0206* (2013.01); *H04W 84/045* (2013.01)

(58) Field of Classification Search
CPC ...... H04W 16/08; H04W 16/28; H04W 52/02
See application file for complete search history.

(56) References Cited

U.S. PATENT DOCUMENTS

2013/0058269 A1  3/2013  Xia et al.
2013/0127474 A1  5/2013  Zhang et al.
2013/0288686 A1* 10/2013  Chou ................. H04L 27/2602
                                                 455/436

(Continued)

FOREIGN PATENT DOCUMENTS

CN       104333892 A     2/2015
WO       WO2018093397    5/2018

OTHER PUBLICATIONS

3GPP, "3rd Generation Partnership Project; Technical Specification Group Radio Access Networks; Evolved Universal Terrestrial Radio Access (E-UTRA); Potential solutions for energy saving for E-UTRAN (Release 10)", Jan. 11, 2011, vol. RAN WG3.

(Continued)

*Primary Examiner* — Sulaiman Nooristany (57) ABSTRACT

Embodiments of the present disclosure are directed to a distributed method and system for independent activation and deactivation of small cells. The method and system consider network traffic at multiple nodes instead of only considering the small cell's own traffic, and may be implemented using existing X2 messages.

16 Claims, 5 Drawing Sheets

(56) References Cited

U.S. PATENT DOCUMENTS

2016/0066191 A1* 3/2016 Li .................. H04W 52/343
                                                    455/443
2016/0309333 A1    10/2016 Guo

OTHER PUBLICATIONS

Supplementary European Search Report for Application No. EP1691995 dated May 14, 2020.
Search Report and Written Opinion dated Feb. 2, 2017 for PCT Application No. PCT/US2016/063188.
EP Office Action for EP Application No. 16921995.3, dated Oct. 19, 2021.

* cited by examiner

FIG. 6B

DISTRIBUTED SON ENERGY SAVING MANAGEMENT IN HETEROGENEOUS NETWORKS

CROSS-REFERENCE TO RELATED APPLICATIONS

This application is a U.S. National Phase of International Application No. PCT/US2016/063188, filed Nov. 21, 2016.

BACKGROUND

Heterogeneous networks (HetNets) are characterized by different types of cells deployed in multiple network or radio layers. HetNets typically have a macro radio layer and an independent small cell radio layer such as a pico or femto cell layer. Typically, small cell coverage is completely overlaid by macro cell coverage. In other words, macro cells typically provide complete coverage such that pico cells complement macro cell capacity. Macro and pico cells may use a mix of different communication technologies such as 3G, 4G, and 5G. Small cells can be activated and deactivated independently from macro cells.

Solutions for Energy Saving Management (ESM) in HetNets have used three different approaches: 1) distributed, independent solutions where the small cells deactivate and reactivate based on their own traffic patterns and without consideration of the network load, 2) use of a centralized Operations, Administration and Management (OAM) service that decides when to deactivate and reactivate small cells, and 3) distributed solutions where, using proprietary messages, small cells interact with macro cells to decide when to deactivate or reactivate. In actual network deployments, it is typically the case that macro and small cells are supplied by different vendors, which restricts the use of proprietary messages for ESM. Meanwhile, option 1 of relying only on the small cell's load is suboptimal since an individual small cell's load does not reflect network-wide load conditions. For example, because of the preference of user equipment (UE) for camping on small cells, which may also be nearer to the UEs, a loaded small cell does not necessarily indicate that other elements of the network have a high load.

Centralized Self-Organizing Network (CSON) solutions for HetNet ESM have considerable disadvantages, primarily due to data only being intermittently available at the central server of a CSON due to the longer granularity periods in collecting Performance Management (PM) data. The time delay in collecting and processing PM data limits the ability of CSON to dynamically respond to current network conditions in a timely manner. This is important for cell re-activation, where an ESM system should be able to quickly react to sudden, unexpected increases in traffic without causing service degradation or failure.

FIELD OF TECHNOLOGY

Embodiments of the present disclosure are directed to a system and method for energy savings management (ESM) in a heterogeneous cellular communications network.

BRIEF SUMMARY

An embodiment of a method for energy savings management (ESM) in a heterogeneous cellular network includes receiving, at each helper cell of a plurality of helper cells in a power savings group of cells that consists of a single reference cell and the plurality of helper cells, a load message transmitted by the reference cell, comparing, by each of the plurality of helper cells, a load value in the load message to at least one predetermined threshold value, and changing an energy management state of only one cell of the plurality of helper cells based on a result of the comparison.

Comparing the load value may include comparing the load value to at least one of a high threshold value and a low threshold value. In addition, the energy management state may be changed from an active state to a deactivated state when the load value is less than the low threshold value, and the energy management state may be changed from a deactivated state to an active state when the load value is greater than the high threshold value.

In an embodiment, at least one of a high threshold value and the low threshold value is based in part on a current traffic level of the associated helper cell. Each of the plurality of helper cells in the group of cells may be associated with a rank in a sequential order, and each of the plurality of helper cells may be sequentially activated or deactivated according to its rank in the sequential order.

Every helper cell of the power savings group may have a coverage area that overlaps with a coverage area of the reference cell. The load message may be transmitted to each of the plurality of helper cells through direct communication links between the reference cell and each respective helper cell, and each cell in the network may belong to a single power savings group. In addition, the order may be based on the extent to which the respective helper cell contributes to spectral efficiency of the reference cell.

Some embodiments of this disclosure are directed to a wireless communication system that has a plurality of helper base stations arranged in a power savings group with a single reference cell whose coverage area overlaps with coverage areas of the plurality of helper cells, wherein each of the helper cells is served by a base station that receives a load message transmitted by the reference cell and compares a load value in the load message to at least one predetermined threshold value. In such a system, an energy management state of one base station of the helper cells changes based on a result of the comparison.

In an embodiment, when all helper cells of the power savings group are in an active state, the first helper cell to deactivate is a helper cell that contributes the most to the spectral efficiency of the reference cell of all the helper cells of the power savings group, and when all helper cells of the power savings group are in an inactive state, the first helper cell to activate is a helper cell that contributes the least to the spectral efficiency of the reference cell of all the helper cells of the power savings group.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
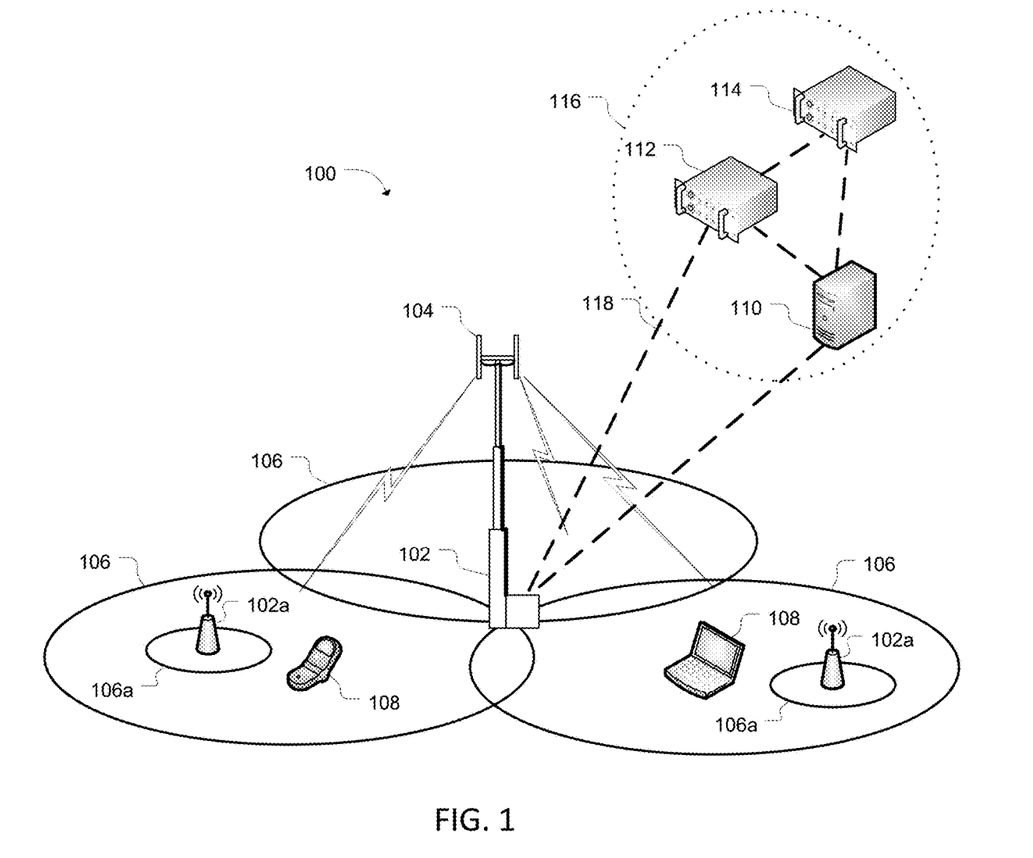
FIG. 1 illustrates a wireless communications system according to an embodiment.

FIG. 1 illustrates a networked communications system 100 according to an embodiment of this disclosure. System 100 includes a plurality of base stations 102, each of which are equipped with one or more antennas 104. Each of the antennas 104 may provide wireless communication for user equipment (UE) 108 in one or more cells 106. Base stations 102 have antennas 104 that are receive antennas which may be referred to as receivers, and transmit antennas, which may be referred to as transmitters.

As used herein, the term "base station" refers to a wireless communications station provided in a location and serves as a hub of a wireless network. For example, in LTE, a base station 102 may be an eNodeB. The base stations may provide service for macrocells, microcells, picocells, or femtocells.

FIG. 1 shows base stations 102a that provide service to small cells 106a that are within a coverage area of macro cells 106. In actual cellular deployments, a plurality of base stations 102a may be located within a cell 106 of a macro cell base station 102. As a result, coverage of one macro-cell 106 may overlap with a plurality of small cells 106a.

The one or more UE 108 may include cell phone devices, mobile hotspots, laptop computers, handheld gaming units, electronic book devices and tablet PCs, and any other type of common portable wireless computing device that may be provided with wireless communications service by a base station 102. In an embodiment, any of the UE 108 may be associated with any combination of common mobile computing devices (e.g., laptop computers, tablet computers, cellular phones, mobile hotspots, handheld gaming units, electronic book devices, personal music players, video recorders, etc.), having wireless communications capabilities employing any common wireless data communications technology, including, but not limited to: GSM, UMTS, 3GPP LTE, LTE Advanced, WiMAX, etc.

The system 100 may include a backhaul portion 116 that can facilitate distributed network communications between backhaul equipment or network controller devices 110, 112 and 114 and the one or more base station 102. As would be understood by those skilled in the art, in most digital communications networks, the backhaul portion of the network may include intermediate links 118 between a backbone of the network which are generally wire line, and sub networks or base stations located at the periphery of the network. For example, cellular mobile devices (e.g., UE 108) communicating with one or more base station 102 may constitute a local sub network. The network connection between any of the base stations 102 and the rest of the world may initiate with a link to the backhaul portion of a provider's communications network (e.g., via a point of presence).

In an embodiment, the backhaul portion 116 of the system 100 of FIG. 1 may employ any of the following common communications technologies: optical fiber, coaxial cable, twisted pair cable, Ethernet cable, and power-line cable, along with any other wireless communication technology known in the art. In context with various embodiments, it should be understood that wireless communications coverage associated with various data communication technologies (e.g., base station 102) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Any of the network controller devices 110, 112 and 114 may be a dedicated Network Resource Controller (NRC) that is provided separately from the base stations or provided at the base station. Any of the network controller devices 110, 112 and 114 may be a non-dedicated device that provides NRC functionality. In another embodiment, an NRC is a Self-Organizing Network (SON) server. In an embodiment, any of the network controller devices 110, 112 and 114 and/or one or more base stations 102 may function independently or collaboratively to implement processes associated with various embodiments of the present disclosure.

In accordance with a standard GSM network, any of the network controller devices 110, 112 and 114 (which may be NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110, 112 and 114 (optionally having NRC functionality) may be associated with a RNC, a serving GPRS support node (SGSN), or any other common network controller device known in the art, such as an RRM. In accordance with a standard LTE network, any of the network controller devices 110, 112 and 114 (optionally having NRC functionality) may be associated with an eNodeB base station, a mobility management entity (MME), or any other common network controller device known in the art, such as an RRM.

In an embodiment, any of the network controller devices 110, 112 and 114, the base stations 102, as well as any of the UE 108 may be configured to run any well-known operating system. Any of the network controller devices 110, 112 and 114 or any of the base stations 102 may employ any number of common server, desktop, laptop, and personal computing devices.

Figure 2:
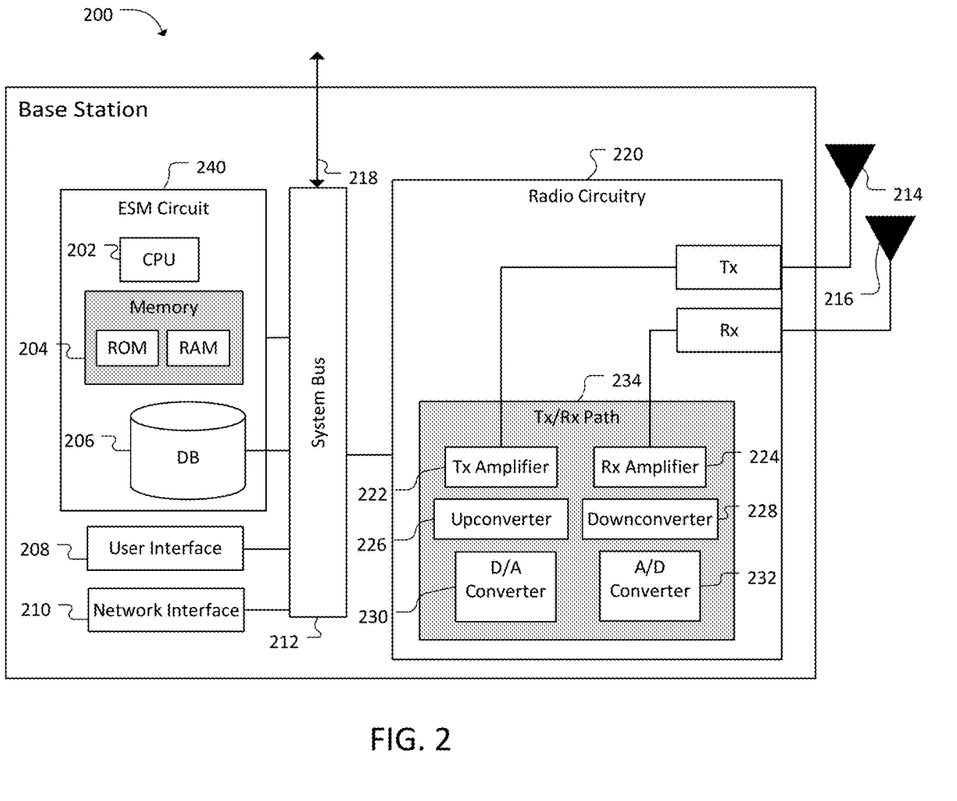
FIG. 2 illustrates a base station according to an embodiment.

FIG. 2 illustrates a block diagram of a base station 200 (e.g., a femtocell, picocell, microcell or macrocell base station) according to an embodiment. The base station 200 includes an Energy Savings Management (ESM) processing circuit 240 including at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

The ESM circuitry 240 may include a processor such as CPU 202, memory 204, and system memory 206. Program instructions for implementing various aspects of ESM may be stored in system memory 206 and loaded into RAM of memory 204 for interfacing with the processor 202. In addition, the ESM circuit 240 may include power-related components that change a power state of the base station 200, elements of the system bus 212 and direct communication link 218 for communicating ESM-related information between base stations, etc.

A base station 200 may also include a database memory 206 storing application and protocol processing software, a user interface 208, a network interface circuit 210 facilitating communication across LAN and/or WAN portions of a backhaul portion of a communication network. The base station 200 may include a direct communication link 218 that facilitates direct communication with one or more base station. For an eNodeB, the direct communication link 218 may be an X2 communication link.

The base station 200 includes radio circuitry 220 for wirelessly transmitting and receiving data. The radio circuitry 220 may include a transmit path including a digital-to-analog converter 230 for converting digital signals from system bus 212 into analog signals to be transmitted, an upconverter 226 for setting the frequency of the analog signal, and a transmit amplifier 222 for amplifying analog signals to be sent to the antenna 214 and transmitted as RF signals.

In addition, the radio circuitry 220 may include a receive path including the receive amplifier 224 for amplifying signals received by the antenna 216, a downconverter 228 for reducing the frequency of the received signals, and an analog-to-digital converter 232 for outputting the received signals onto the system bus 212. The system bus 212 facilitates data communication between the hardware resources of the base station 200.

The base station 200 may have a number of transmit/receive paths 234 comprising multiple digital-to-analog converters, upconverters, and transmit amplifiers as well as multiple analog-to-digital converters, downconverters, and receive amplifiers. Additionally, antennas 214 and 216 may include multiple physical antennas for transmitting beamformed communications. In an embodiment, the base station 200 may include certain functionality associated with distributed SON. The base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.).

Some of the components of ESM circuit 240, such as RAM memory 204, may serve multiple functions in the base station 200, while other components may be dedicated to distributed ESM operations. However, even components that serve multiple functions may be specifically configured for distributed ESM. For example, when RAM is implemented for distributed ESM, the RAM stores ESM-specific program instructions for rapid access by the processor 202.

There are multiple approaches to implementing ESM in cellular communication networks. One approach is to allow small cells to make independent decisions about their own power states. However, because small cells have limited network awareness, conventional implementations have small cells making power state decisions based on their individual traffic levels.

An assumption of this approach is that a small cell will deactivate itself when traffic falls below a certain threshold. However, in practice, this assumption is not always correct. In some instances, traffic reduces for all cells at a similar rate, so no single cell gets such low traffic compared to others that it can be easily deactivated. In effect, waiting for one cell to reduce below an individual independent threshold may imply waiting for all cells to be that low. Simply stated, a small cell's load does not reflect network-wide load conditions.

Consequently, independent small cell ESM decisions are not optimal regarding deactivation, and can be unusable for reactivations. For example, owing to UEs' preference for small cells, either due to being nearer, or due to a better Signal to Interference and Noise Ratio (SINR), or even owing to network operation biases, a highly loaded small cell does not necessarily indicate that the network has high load.

Central SON (CSON) solutions attempt to remedy shortcomings of totally independent ESM by coordinating through a central server, such as a SON server or other OAM element. The central server entity is able to evaluate the load among multiple cells and chooses a deactivation candidate in a way that maximizes the resource utilization in the (sub) network from its perspective. One challenge of CSON ESM is that small cells must always wait for deactivation and reactivation signals from the central server. Because OAM elements receive and process load data at a low frequency, it is not currently viable to implement an effective ESM system using a central approach. Moreover, if the small cells lose connectivity to the OAM, then ESM cannot proceed.

Conventional hybrid solutions allow small cells, through proprietary messages, to communicate with macro cells in evaluating network load and deciding de/reactivation candidates. Such an approach works well if the same vendor supplies all the macro and small cells, which is rarely the case in existing networks. ESM solutions with proprietary messages are inapplicable in the multivendor HetNet environments.

Embodiments of the present disclosure overcome these disadvantages by using non-proprietary signaling between helper cells and reference cells to share load information with minimal latency.

Figure 3:
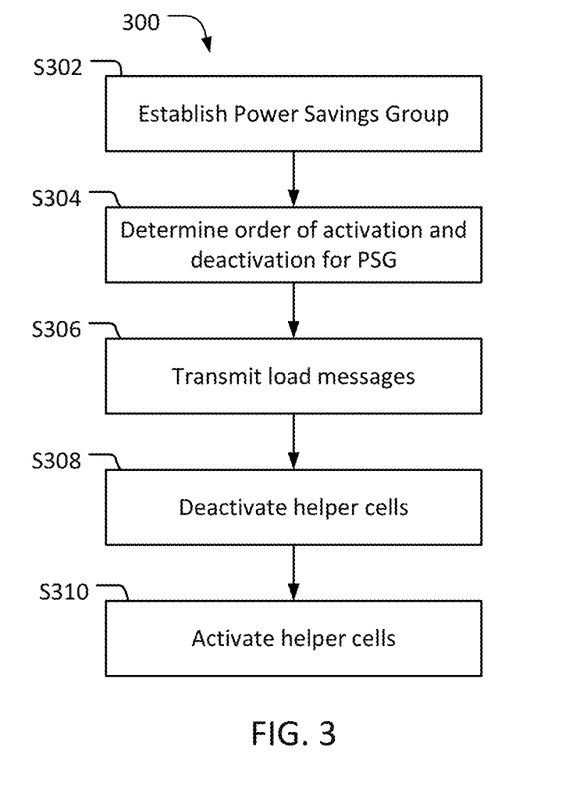
FIG. 3 illustrates a process for energy savings management in a heterogeneous network according to an embodiment.

FIG. 3 shows an embodiment of a process 300 for distributed ESM in a cellular telecommunications network. In process 300, a Power Savings Group (PSG) is established at S302. The PSG includes a set of base stations that cooperate with one another to efficiently manage energy savings in a predetermined area.

Figure 4:
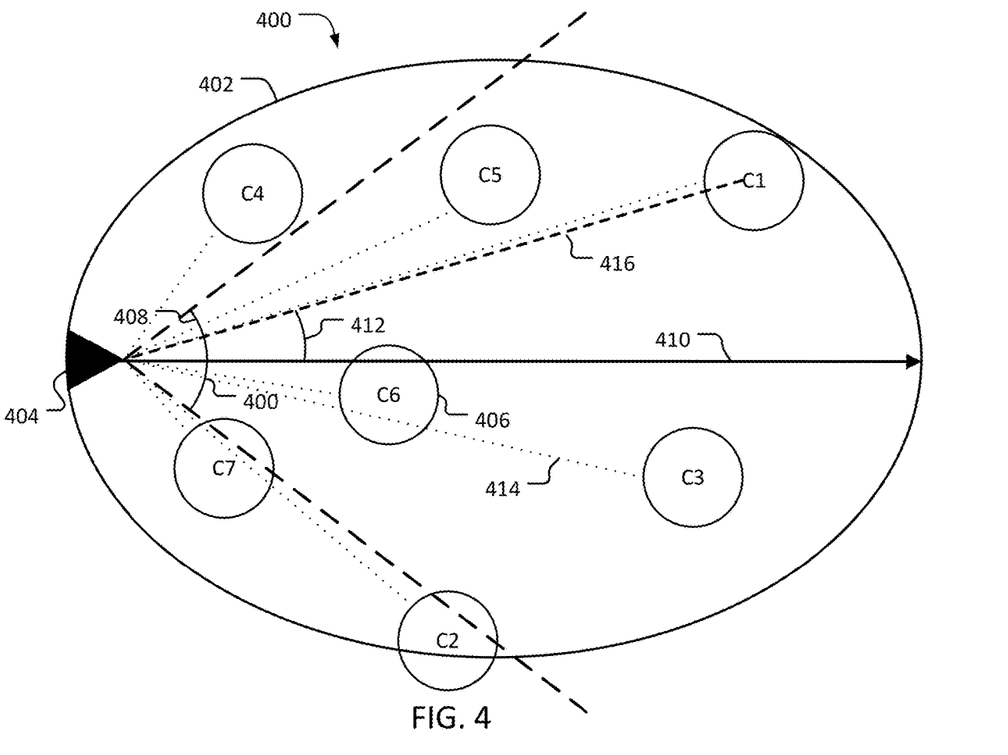
FIG. 4 illustrates a power savings group according to an embodiment.

FIG. 4 shows an example of a PSG 400 according to an embodiment. A PSG 400 may include a single reference cell 402 served by a base station 404 whose coverage area overlaps the coverage area of a plurality of helper cells 406. Each of the helper cells 406 in PSG has a smaller coverage area than the coverage area of reference cell 402, and the coverage area of the reference cell overlaps the coverage areas of the helper cells. In this respect, the reference cell 402 may be referred to as an umbrella cell that overlaps, at least in part, with the coverage area of the helper cells 406.

The base station 404 that serves reference cell 402 may be a macrocell base station such as an eNodeB, while helper cells 406 may be small cells such as micro, pico or femto cells. However, reference cell 404 is not limited to being a macrocell, so long as its coverage area overlaps with the coverage areas of a plurality of helper cells 406. Similarly, helper cells 406 may be macrocells, and the coverage areas of the helper cells are not required to be smaller than the coverage area of the reference cell 402.

In an embodiment, a PSG 400 consists of a single reference cell 402 and a plurality of helper cells 406 that can be deactivated without a substantial loss of coverage in the network. In the embodiment of FIG. 4, the reference cell 402 has primary responsibility for coverage in its area, while the helper cells 406 are available to reinforce capacity of the reference cell 402. In an embodiment, each cell in a network only belongs to one PSG 400.

The cellular technologies of various cells in a PSG 400 may be different from one another. For example, a 4G reference cell 406 may be in a PSG 400 with helper cells that are both 4G and 5G. It is possible to include older technology cells such as 2G and 3G in a PSG 400. However, the 2G and 3G standards do not provide a low-latency direct cell-to-cell communication link. Accordingly, additional infrastructure may be required to implement embodiments of this disclosure for pre-LTE technologies.

A PSG 400 may be established by identifying a reference cell 402, and identifying smaller cells 406 whose coverage areas overlap with the coverage area of a reference cell 406. A RF planning tool could be used to determine the amount of coverage area overlap, or network planners could manually configure groups. Network data such as handover metrics could be used to assign cells to groups, where a given small cell is assigned to the same PSG 400 as a larger cell with which the small cell exchanged the highest number of handovers.

Each PSG 400 has a predetermined order of cell activation and deactivation that is determined at S304. For example, each helper cell 406 may be assigned a ranking which represents its position in a sequence of activating and deactivating cells based on network loading conditions, e.g., 1, 2, 3, etc. The order of activation and deactivation may be determined in a way that maximizes the network's spectral efficiency. For example, helper cells 406 that contribute the least to spectral efficiency are powered down first and activated last, while the helper cells that contribute the most to the spectral efficiency are powered down last and activated first.

An embodiment activates helper cells 406 starting with the cells which are furthest, in radio terms, from the reference cell, e.g., the helper cells which are closest to the edges of the reference cell 402. A user nearest such a small cell would have the worst spectral efficiency at the reference cell 402. So if that user is transferred to the small cell, more resources are freed at the reference cell.

Helper cells 406 that are farthest in radio terms from the reference cell 402 are activated first. For example, FIG. 4 shows that helper cells C1 and C2 are located at edges of the reference cell 406. A user nearest to these small cells would have the worst spectral efficiency at the reference cell 402 compared to the other helper cells 406. The helper cells 406 in FIG. 4 are numbered in an expected order of activation, where cell C1 would be activated first, C2 would be activated second, etc. Deactivation occurs in reverse of the order of activation.

As seen in the order of cells in FIG. 4, while distance 416 from the base station 404 and distance from cell edges are relevant to the order, they are not the only determinants of the activation order. Other factors that may be considered include the angle 412 between the helper cell 406 and boresight 410 of the reference cell 402, position relative to the beamwidth 408 of the reference cell, characteristics of the helper cell such as transmit power, coverage area, technology, usage metrics such as throughput, etc. Comparing cell C2 to C3, it is possible, based on positions of the cells relative to boresight 410, that activating cell C3 results in higher spectral efficiency than activating cell C2 since a user near cell C2 will have a higher SINR from the reference cell 402.

In an embodiment, the highest ranked helper cell 406 for activation order is the cell that contributes the most to the spectral efficiency of the helper cells of its PSG group 400. The highest ranked helper cell 406 for activation order may have a location that has a lower spectral efficiency for the reference cell 402 coverage area than other helper cell locations. In other words, the activation order may be determined by determining spectral efficiency of the reference cell 402 for each helper cell 406.

In an embodiment, a cell selector is based on the triangulation of heat floor. An analogy of heat flow can be used to model the load in reference and helper cells, and heat flow can be used to determine activation order in a PSG 400. In a heat-flow model, the load at a reference cell j may be considered as an amount of secondary heat generated in the cell, with mobile devices in the cell as the primary distributed heat sources. Maximum load (heat) is generated at the edge of the cell, so that a higher level of load is transferred from cell j if a new small cell i is activated closer to the edge of cell j.

The following Equation 1 considers a reference cell 402 j with cell range $R_j$ and having a set of helper cells 406 i∈I (i=1, 2, 3). For a helper i, given distance $d_{ij}$ to each cell j with unit load, induced heat intensity (from hotspot near j), is:

$$h_{ij} = \begin{cases} (r_{ij})^r; & r_{ij} < R_j \\ (r_{ij})^r \cdot \left[1 - \left(\frac{r_{ij} - R_j}{R_j}\right)^{\frac{1}{r}}\right]; & r_{ij} > R_j \end{cases} \quad \text{[Equation 1]}$$

$$\text{with } r_{ij} = \frac{d_{ij}}{\cos(\alpha^\tau)}$$

$d_{ij}$ is the distance between i and j while $R_j$ is the radius or range of cell j. α is the angle between the direction of cell j and the line between cells j and i, which for an Omnidirectional cell would be α=0, since the line between the two cells lies along the path of maximum gain. r is the coefficient of heat floor with an assumed default value of 1, which is used as a general parameter. τ is a beamwidth factor that accounts for how much, for a given distance d, the received signal changes as a function of the antenna's beamwidth. Specifically, for the different antenna beamwidths of 60°, 90°, 120°, or 360° (omni), τ=0.3; 0.45; 0.5; 1 respectively.

In Equation 1, the heat, which represents the cell load, can be measured in terms of carried data, e.g., Mbps, or in terms of used cell resources, e.g., LTE Physical Resource Blocks. For cell activation under reference cell j with load $\rho_j$, the ESM system activates the helper cell with the highest heat intensity, $h_i$ due to the load $\rho_j$:

$$\text{Candidate} = \operatorname*{argmax}_i \{\rho_j * h_{ij}\} \quad \text{[Equation 2]}$$

For cell deactivation, an embodiment disables those helper cells first, whose induced heat on the reference cell is the lowest, which are cells with low load and/or closer to the reference cell center. Assuming reference cell j and helper cell i, the heat intensity $h_{ji}$ as defined in Equation 1, an ESM system deactivates helpers with the lowest induced heat, but for which the expected total load added to the reference cell is $\Delta\rho_j < (T\ M\ high - T\ M\ low)$:

$$\text{Candidate} = \underset{i}{\operatorname{argmin}} \{\rho_i * h_{ij}\} \quad [\text{Equation 2}]$$

Persons of skill in the art will recognize that the heat flow approach described above can be used to determine activation and deactivation order at S304 based on current network conditions, as well as to determine a static order that can be set for a given PSG. For example, a heat-based simulation can be run for a given PSG 400 using current or historical load values, and the resulting order can be implemented as a static activation order.

There are several possible approaches for communication within a PSG 400. In order for a helper cell 406 to independently activate or deactivate, it is helpful to be aware of the energy state of the other helper cells. To accomplish this, the base stations of helper cells 406 could message one another directly when their state changes, so that every helper cell 406 is informed when another helper cell changes its energy state. However, such a scheme results in a relatively large amount of messaging between cells.

In another embodiment, each helper cell 406 in a PSG 400 retains a predetermined activation order, which is the same for every helper cell in the PSG. When each helper cell 406 uses the same process for determining a time to activate or deactivate a cell according to the activation order, and each helper cell is aware of its rank in the activation order, each helper cell can independently determine when to activate and deactivate in the predetermined activation order.

Cells in PSG 400 activate and deactivate according to the load on the group. Accordingly, load messages are transmitted to the helper cells 406 at S306. In an embodiment, activation and deactivation of helper cells 406 is based on loading of the reference cell 402, so transmitting load messages at S306 comprises transmitting, from the base station 404 of reference cell 402, load messages over direct communication links 414 to each helper cell 406 of the same PSG 400.

The direct communication links 414 of FIG. 4 may be direct wireline links such as the X2 links in an LTE system. Attributes of the X2 link are specified in the LTE standard. Similar direct base station-to-base station communication links are likely to appear in future cellular communications standards which can be used for the same purpose. In other embodiments, the direct communication links 414 may be wireless links, such as a wireless control channel. An advantage of using a standardized direct communication link such as X2 is that it can be implemented using network equipment from different vendors.

The load messages transmitted at S306 may be transmitted at a regular time interval, such as every 5, 10 or 60 seconds, or on an as-needed basis when load levels are sufficient to trigger state changes for the helper cells 406. An embodiment that transmits load signals on an as-needed basis may reduce the total amount of signaling that is present in a system. In one specific embodiment, the load messages are Composite Available Capacity Information Elements (IEs) as specified in the X2 application protocol (X2AP) of 3GPP Release 9.

There are several possible advantages that can be realized from distributing ESM activation and deactivation processes across the helper cells 406. When a helper cell 406 makes its own ESM determinations, it is not necessary to transmit control signals from a central entity, reducing a network's internal signaling load. Distributed processing also eliminates lag associated with centralized approaches.

When the helper cells 406 make independent determinations regarding their activation state based on load messages from reference cell 402, direct communication links 414 may be installed between the helper cells 406 and the reference cell 402. However, it is not necessary to establish direct links between each helper cell 406. In addition, use of standardized messaging at S306 allows communication between cells from multiple vendors.

Two thresholds are defined and configured in all cells in a PSG 400—a Low Load Threshold (ThL), and a High Load Threshold (ThH). The low threshold ThL indicates a low load level within the reference cell 402 at which load some helper cells 406 may be deactivated since the reference cell has free capacity and can adequately serve traffic that would otherwise have been served by the deactivated helper cells. Similarly, high threshold ThH represents a level at which the reference cell 402 would benefit from handing over users to helper cells 406. The low load threshold may be, for example, a value from 10% to 40%, while the high load threshold may be a value from 50% to 70%. The precise threshold values may vary between embodiments, and may be tailored to the conditions of a particular PSG 400.

Figure 5:
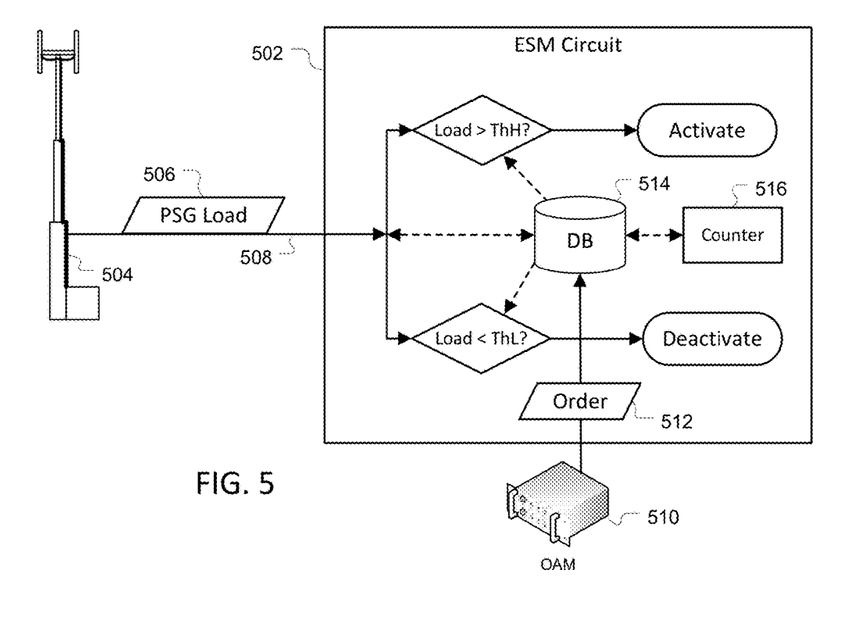
FIG. 5 illustrates an ESM system according to an embodiment.

FIG. 5 shows an embodiment of an ESM system performing a distributed ESM process 300. The ESM circuit 502 corresponds to the ESM circuit 240 shown in FIG. 2, and is disposed in each helper cell 406 of a PSG 400.

In FIG. 5, ESM circuit 502 receives PSG load values 506 from reference base station 504 over direct communication link 508. The ESM circuit 502 also receives activation order data 512 from OAM system 510. The activation order information 512 informs the helper cell of its position or rank in the order as well as the total number of cells in its PSG. This information is used by the helper cell to track the sequence of activation and deactivation so that the helper cell activates and deactivates according to its rank in the order. Other information may be received by the helper cell from the OAM system 510 related to ESM, including threshold levels, updates to the order 510 of the PSG, etc. Load messages 506 and order values 510 may be stored at database 514.

Helper cells 406 may track their positions relative to the activation order in various ways. In one embodiment, each helper cell 406 in a PSG 400 is configured with a counter 516, which may include separate activation and deactivation counters, which the helper cells use to count up or down their activation and deactivation sequences. In such an embodiment, the deactivation counter may be initially set to zero (0) while the activation counter is set to be equal to the rank of the highest-ranking deactivated cell. In an embodiment, the ESM order may be reset for each of the helper cells on a periodic basis, such as once per day or week.

In such an embodiment, the helper cell 406 tracks the value of the PSG Load 506 and initiates its deactivation counter 516 the first time the load is less than the low threshold. In other words, the helper cell enters a "planned to be deactivated" state. The helper may continue to periodically check Load 506 and it increment the deactivation counter 516 each time the Load is less than ThL, otherwise it may reset the deactivation counter. The helper cell 406 enters a deactivating state 520 at S308 if the value of its deactivation counter is greater than its rank, which is set initially according to the cell deactivation order.

However, embodiments are not limited to this specific example. In some embodiments, a threshold must be exceeded a predetermined number of times in a row before a helper cell changes its state. In another embodiment, each helper cell 406 may have a single counter 516 that indicates the highest ranked active cell, the highest ranked inactive cell, or some other value that tracks a position in the activation order.

In an embodiment, heavily loaded helper cells 406 are treated differently from other helper cells when deactivating cells at S308. For example, the deactivation condition can be adjusted using a traffic scaling factor (TrafficFactor) so that the cell only enters a deactivating state if DeactivationCounter>TrafficFactor*rank. The TrafficFactor may be set to be greater than or equal to 1 depending on the traffic carried by the helper cell 406. An example of possible TrafficFactor values is:

1.0—low load, e.g. load<50%
1.5—medium load, e.g. 50%<load<75%
2.0—high load, e.g. 75%<load The effect of the traffic factor is that if a first helper cell 406 is heavily loaded while the next candidate is not, the traffic factor delays the first cell's deactivation, and in so doing allows the next candidate to enter the deactivated state before the first cell. If the next candidate's deactivation raises the load significantly, then the first cell may not be deactivated.

In another embodiment, asymmetry between activation conditions and deactivation conditions can be biased by adapting the high and low threshold values. The threshold values can be adapted to favor activation in situations where quality and service are priorities, or to favor deactivation where energy savings is prioritized.

In another embodiment, bias may be selectively applied to helper cells 406 by modifying activation and/or deactivation conditions so that more helper cells are activated or deactivated. In particular, the rank values used for activation or deactivation can be modified to prioritize activation or deactivation. In an embodiment, such modification may be provided by an OAM system 510 so that a network operator has some control over a distributed ESM implementation.

When cells deactivate at S308, they may be phased through several stages of deactivation. For example, transmit power and/or handover offset values may be gradually changed over time to encourage UEs to offload from the helper cell that is being deactivated without causing service interruptions or traffic spikes.

Embodiments may simultaneously deactivate multiple cells at once at S308. For example, in scenarios involving many helper cells 406 under a single reference cell such as at a sports stadium, traffic can decrease dramatically in a relatively short time.

In a first embodiment, helper cells 406 may be permitted to deactivate irrespective of the current rank in the activation order. The deactivation condition could be an amount of traffic over time. In effect, if the helper cell's load becomes so low even though by count its turn has not reached, it may deactivate itself even as it continues to count the number of cells that, according to the official sequence, are deactivated. Then, if the load increases so that the reference cell 402 exceeds its upper threshold, the helper cell 406 can reactivate itself immediately or at the same time when it would otherwise activate according to its rank in counter 516.

For example, for a helper cell x with deactivation rank 7 and that at time t1, the highest ranking deactivated cell is 3, so that 3 more cells must normally be deactivated before x is due for deactivation. If cell x realizes that its load is low, it can deactivate itself even as it continues counting. Then if, at another time t2, the load increases, both cell x and the rank-3 cell are reactivated. In this example, cell x further optimizes its energy consumption yet the rank count is also maintained.

In an embodiment, the rate at which load messages 506 are transmitted from the reference base station 504 to the helper cells can vary over time. For example, the reference base station may increase the frequency of load messages, which effectively increases the rate at which helper cells activate or deactivate. The thresholds for rate variation may be substantially higher or lower than upper and lower thresholds used by the helper cells to determine power states. For example, if an upper activation threshold is 70% of capacity, a rate increase threshold may be 80%.

Persons of skill in the art will recognize that multiple variations on the rate variance concept are possible. For example, the rate variance can be limited to a predetermined number of subsequent load messages 506, such as 1 or 3, after which load messaging returns to its normal rate. In another embodiment, the accelerated load messaging may continue until another threshold is reached, e.g. if the upper rate threshold is 80% and the activation threshold is 70%, the load messaging rate may drop back to default at the interim load value of 75%. Different values and triggers may be assigned to various PSGs based on their particular conditions.

When one or more of the helper cells 406 are in an energy savings state and receive load messages 506 that exceed the high threshold ThH, the highest ranked helper cell in the activation order changes its state to an active energy state at S310. In more detail, when a load message 506 that exceeds high threshold ThH is received by the helper cells, all helper cells 406 in an energy savings state may enter a PlannedToBeActivated state in anticipation of being activated. However, in an embodiment, only the highest ranked helper cell is activated when the high load message 506 is received, while the other helper cells wait for subsequent load messages before reactivating.

Since at least one cell is deactivated each time the low load condition is fulfilled, the number of deactivated cells is at least equal to the deactivation events. Consequently, the highest-ranking deactivated cell may be the cell whose rank is equivalent to the current count of deactivation events.

In an embodiment, the helper cells count deactivation and reactivation events to keep track of the highest-ranking deactivated cell using counter 516. When a reactivation event occurs, each cell compares its rank to the highest-ranking deactivated cell's rank and reactivates itself if the two are equal. Otherwise, the cell updates the highest-ranking deactivated cell rank and eventually reactivates itself when the highest-ranking deactivated cell's rank becomes equal to the cell's own rank.

Figure 6A:
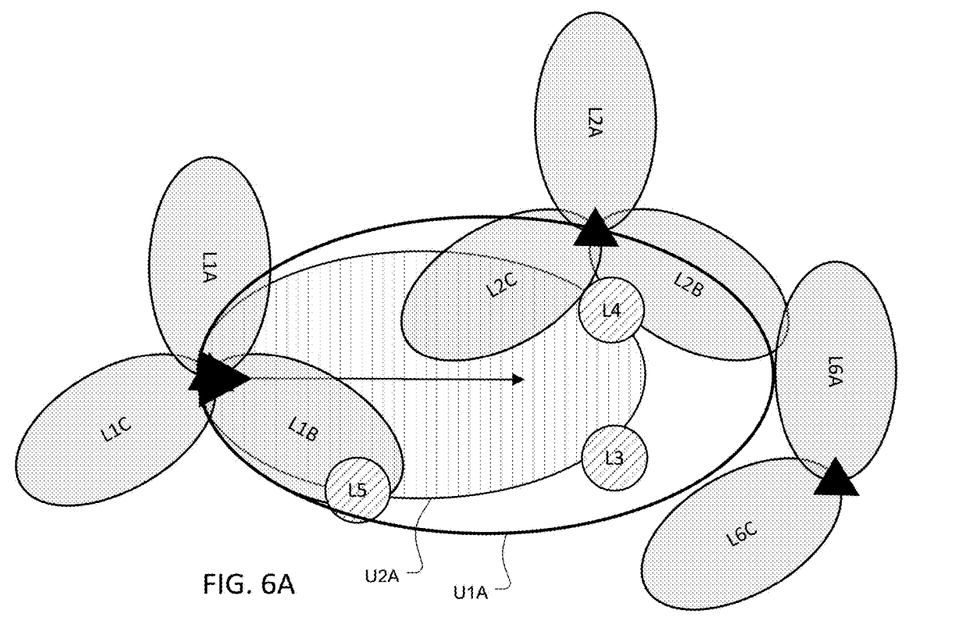
FIG. 6A illustrates a power savings group according to an embodiment.
Figure 6B:
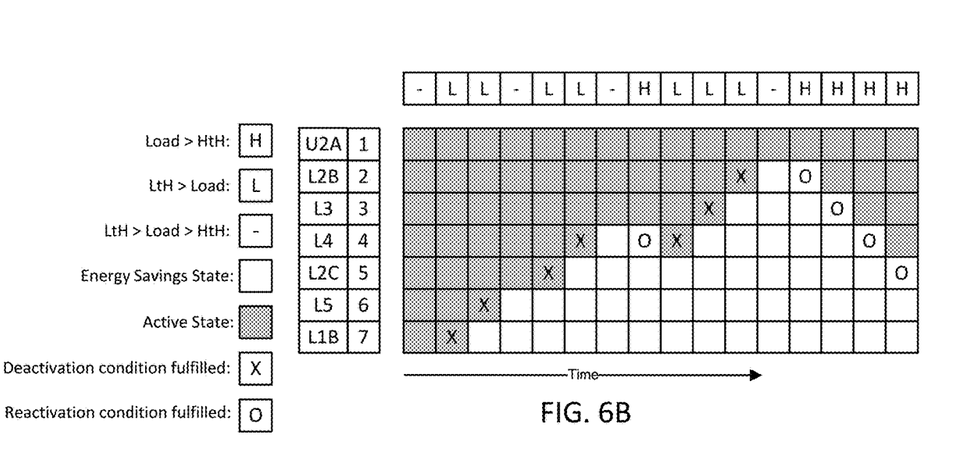
FIG. 6B illustrates energy savings in the PSG of FIG. 6A.

FIGS. 6A and 6B illustrate an embodiment of activating and deactivating helper cells in a power savings group according to embodiments of this disclosure. FIG. 6A shows a hypothetical network arrangement of three-sector cells L1, L2 and L3 that are in the vicinity of umbrella cell U1A. Cell U1A is overlapped by cell U2A, so that cell U2A effectively supplements the coverage of cell U1A. The base station for cell U1A is co-located with the base station for single-carrier cells L1A-C. In addition, circles L3, L4 and L5 represent small cells such as femto cells with omnidirectional antennas.

In the embodiment shown in FIG. 6A, the cell with the largest coverage area, umbrella cell U1A, is designated as a reference cell for a PSG. Other smaller cells are compared to cell U1A, and when the coverage areas of the smaller cells overlaps with the coverage area of U1A more than other neighboring reference cells, they are added as helper cells to the U1A's PSG. Consequently, an activation order from the first cell to activate when all cells are deactivated could be L1B (120°), L5, L2C (240°), L4, L3, L2B (120°), U2A. The order shown in the activation table of FIG. 6B is the activation order, which is the inverse of the deactivation order.

In FIG. 6B, the vertical numbered column represents cell activation order values. The grid shows power states of the corresponding cells, where a shaded square represents a time period in which the cell is active, and a non-shaded square represents a time period in which the cell is inactive. The width of each square in the grid represents a time interval so that a time progression of which helper cells are in active or inactive states is shown from left to right.

The order values in FIG. 6B are arranged so that the cell with the order value of "7" (cell L1B) is the first cell to deactivate when all cells are active, and the cell with the order value of "1" (cell U2A) is the first cell to activate when all cells are inactive. Note that helper cell U2A is deactivated last and activated first because, according to the order determined at S304, it ranks lower (in order of deactivation) than other cells owing to its comparative degree of overlap with the reference cell U1A.

When a load message is received from reference cell U1A that is less than the low threshold value, the reference cell with the lowest activation order ranking changes its state so that it is inactive in the subsequent time period. The receipt of a load message that is less than the low threshold is indicated by an "X," while the receipt of a load message that is greater than the high threshold is indicated by "O."

Embodiments of this disclosure provide numerous advantages to conventional wireless communications technologies. Embodiments may be implemented using pre-existing hardware at base stations. Embodiments provide distributed ESM without heavily relying on centralized control or on proprietary messages, where smaller cells can independently determine when to activate and deactivate without requiring a specific trigger from an OAM system or a reference cell. Because members of a PSG group are phased in or out of activate status, energy savings can be efficiently accomplished without compromising coverage and network quality.

Embodiments of this disclosure represent improvements to an OAM system as well. While embodiments may use direct communication links between the helper cells and the reference cell, direct communication links between all helper cells are not required. With respect to an LTE network, this reduces the amount of X2 link setups compared to other distributed solutions in which all cells communicate directly with one another to share load information.

This disclosure describes distributed ESM processes and systems that avoid deactivating and reactivating all cells at the same time. In an embodiment, all helper cells see that the load is low and they all increment their deactivation counters, but only one cell deactivates at a time. Then if the PSG load, which is the reference cell's load, increases beyond the lower threshold, other cells will cease to count towards deactivation and reset their deactivation counters. Accordingly, the most spectrally efficient cell will be activated before less spectrally efficient cells.

What is claimed is:

1. A method for energy savings management (ESM) in a heterogeneous cellular network, the method comprising:

receiving, at each helper cell of a plurality of helper cells in a power savings group of cells that consists of a single reference cell and the plurality of helper cells, a load message transmitted by the reference cell;

comparing, by each of the plurality of helper cells, a load value indicating a load on the reference cell in the load message to at least one predetermined threshold value; and changing an energy management state of only one cell of the plurality of helper cells based on a result of the comparison, wherein each of the plurality of helper cells in the group of cells is associated with a rank in a sequential order based on the extent to which the respective helper cell contributes to spectral efficiency of the reference cell.

2. The method of claim 1, wherein comparing the load value to the at least one predetermined threshold value comprises comparing the load value to at least one of a high threshold value and a low threshold value.

3. The method of claim 2, wherein the energy management state is changed from an active state to a deactivated state when the load value is less than the low threshold value, and wherein the energy management state is changed from a deactivated state to an active state when the load value is greater than the high threshold value.

4. The method of claim 2, wherein the at least one of the high threshold value and the low threshold value is based at least in part on a current traffic level of an associated helper cell.

5. The method of claim 1, wherein each of the plurality of helper cells is sequentially activated or deactivated according to its rank in the sequential order.

6. The method of claim 1, wherein every helper cell of the power savings group has a coverage area that overlaps with a coverage area of the reference cell.

7. The method of claim 1, wherein the load message is transmitted to each of the plurality of helper cells through direct communication links between the reference cell and each respective helper cell.

8. The method of claim 1, wherein no cell in the network belongs to more than one power savings group.

9. A wireless communication system comprising:

a plurality of helper base stations arranged in a power savings group with a single reference cell whose coverage area overlaps with coverage areas of the plurality of helper cells, wherein each of the helper cells is served by a base station that includes a memory and a processor which executes program instructions stored on the memory to:

receive a load message transmitted by the reference cell; and compare a load value indicating a load on the reference cell in the load message to at least one predetermined threshold value, wherein an energy management state of one base station of the helper cells is changed based on a result of the comparison, wherein each of the plurality of helper cells in the group of cells is associated with a rank in a sequential order based on the extent to which the respective helper cell contributes to spectral efficiency of the reference cell.

10. The system of claim 9, wherein each base station compares the load value to the at least one predetermined threshold value by comparing the load value to at least one of a high threshold value and a low threshold value.

11. The system of claim 10, wherein the energy management state is changed from an active state to a deactivated state when the load value is less than the low threshold value, and
   wherein the energy management state is changed from a deactivated state to an active state when the load value is greater than the high threshold value.

12. The system of claim 10, wherein the at least one of the high threshold value and the low threshold value is based at least in part on a current traffic level of an associated helper cell.

13. The system of claim 9, wherein each of the plurality of helper cells is sequentially activated or deactivated according to its rank in the sequential order.

14. The system of claim 9, wherein base stations of the wireless communication system includes a plurality of power savings groups, and no base station belongs to more than one of the power savings groups.

15. The system of claim 9, wherein the load message is transmitted to each of the plurality of helper cells through direct communication links between the reference cell and each respective helper cell.

16. The system of claim 9, wherein, when all helper cells of the power savings group are in an active state, the first helper cell to deactivate is a helper cell that contributes the most to the spectral efficiency of the reference cell of all the helper cells of the power savings group, and wherein, when all helper cells of the power savings group are in an inactive state, the first helper cell to activate is a helper cell that contributes the least to the spectral efficiency of the reference cell of all the helper cells of the power savings group.

* * * * *